Sept. 28, 1971 P. R. MORGAN 3,608,149
INJECTION MOLDING MACHINE
Filed Nov. 6, 1968 3 Sheets-Sheet 1
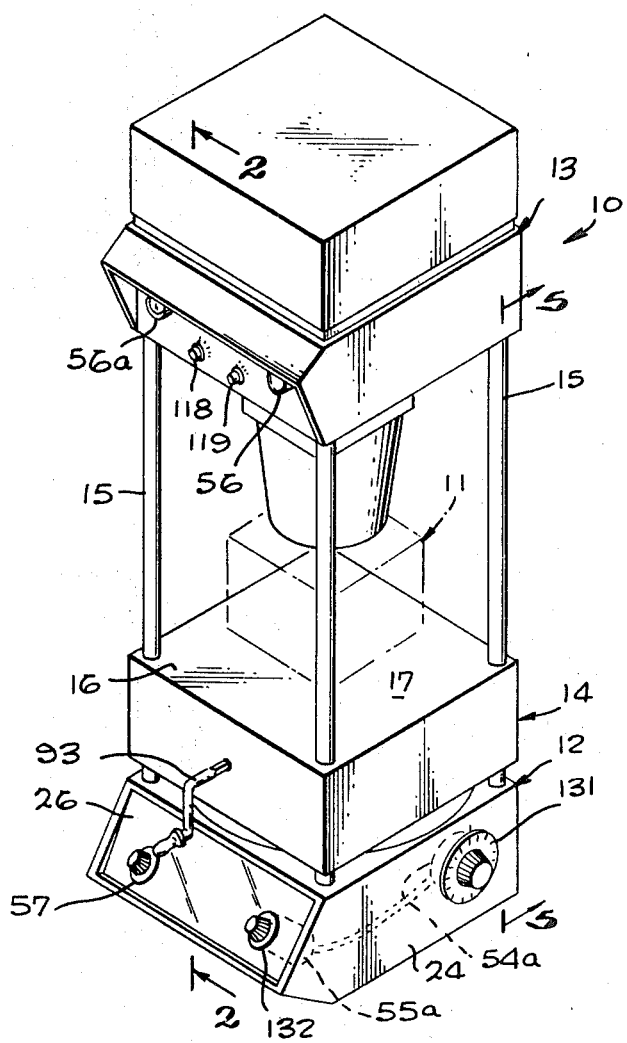
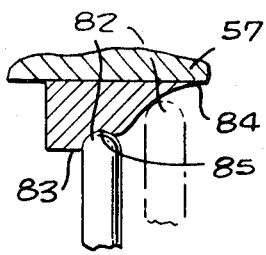
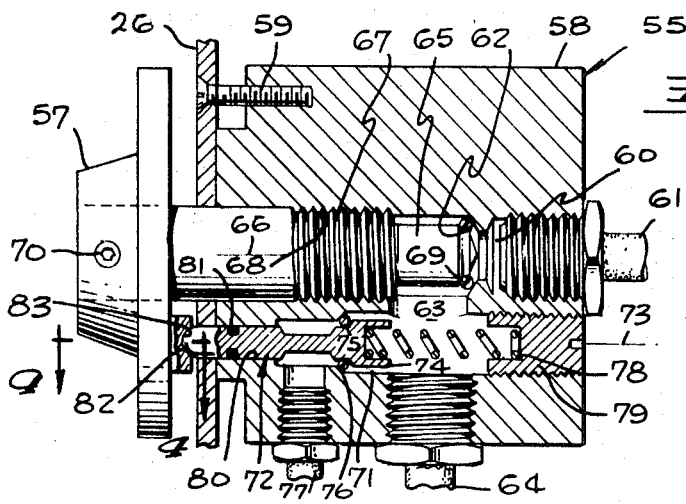
PHILIP R. MORGAN
INVENTOR.
BY William P. Green
ATTORNEY

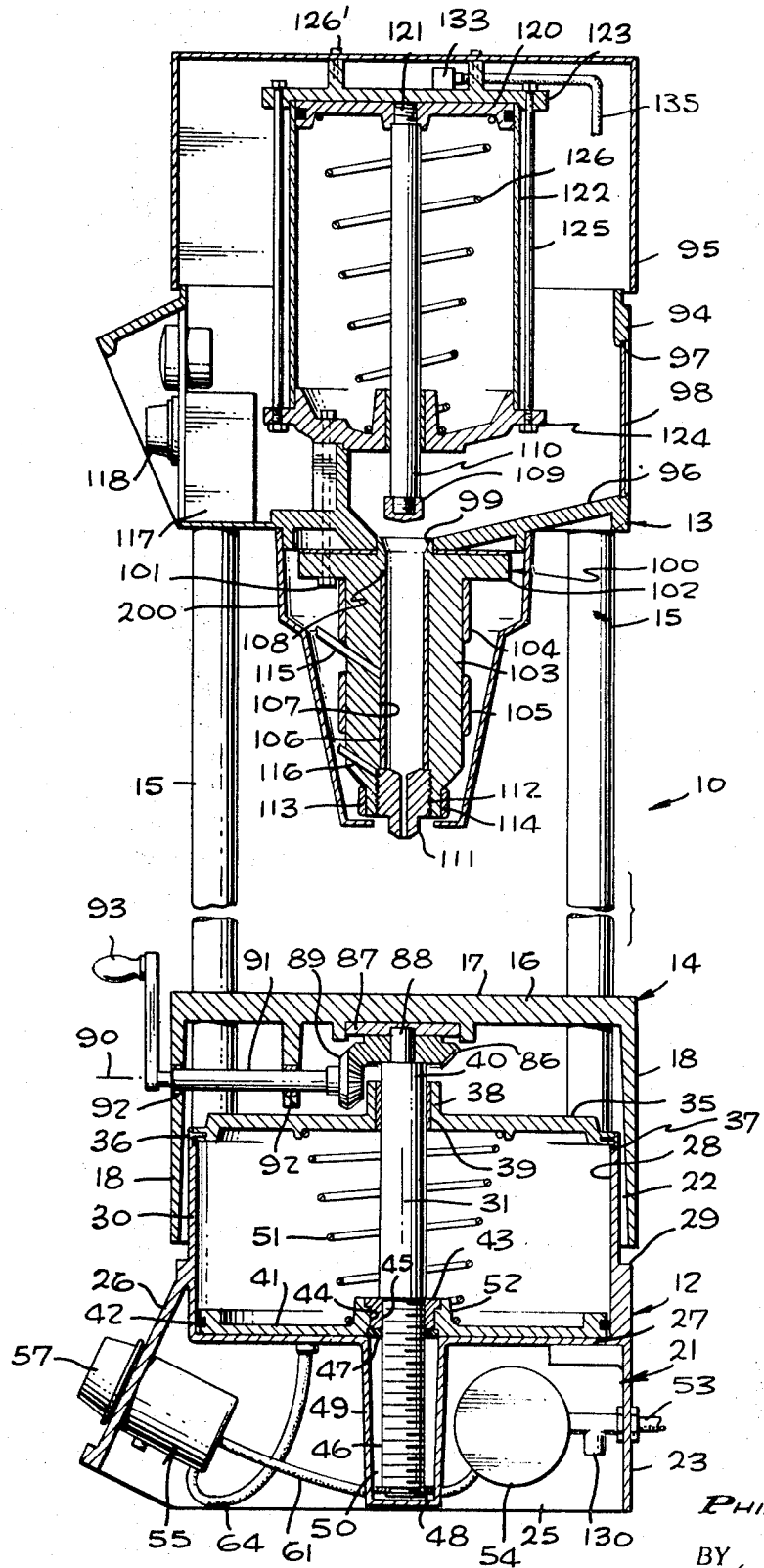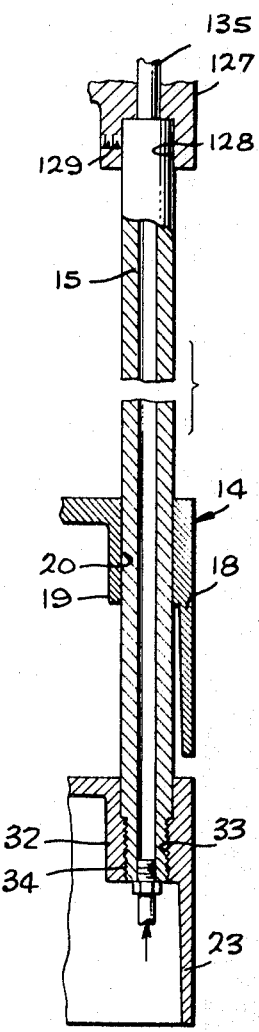
Fig. 2
Fig. 5

Sept. 28, 1971   P. R. MORGAN   3,608,149
INJECTION MOLDING MACHINE
Filed Nov. 6, 1968   3 Sheets-Sheet 3

PHILIP R. MORGAN
INVENTOR.

BY William P. Green
ATTORNEY

United States Patent Office 3,608,149
Patented Sept. 28, 1971

3,608,149
INJECTION MOLDING MACHINE
Philip R. Morgan, Monrovia, Calif., assignor to Morgan Industries, Inc., Los Angeles, Calif.
Filed Nov. 6, 1968, Ser. No. 773,736
Int. Cl. B22d 33/04; D01b 1/10
U.S. Cl. 18—30LA                                6 Claims

ABSTRACT OF THE DISCLOSURE

An injection molding machine having a base, an injection head spaced above the base and supported on vertical columns, and a table mounted to move upwardly and downwardly along the columns to clamp a die between the table and the head in injecting position. The table is actuable vertically by a piston and cylinder mechanism within the base, to clamp the die against the injection head, and is adjustable vertically relative to the actuating piston by adjustment of a table supporting screw which extends through and threadedly and adjustably engages the piston.

BACKGROUND OF THE INVENTION

This invention relates to improved injection molding equipment, adapted for injecting resinous plastic material or the like into a die under pressure in a molding operation.

There are many types of businesses and institutions in which it frequently becomes desirous to produce a short run or very limited number of injection molded parts, and in which the economics of the situation render it impractical or unfeasible to utilize a conventional full size molding machine for the purpose. For instance, such small numbers of injection molded parts may be required in prototyping shops, research and development laboratories, technical and vocational training institutions, and in various specialized short run production applications. There have in the past been devised certain small size injection machines for serving these purposes, but all such machines with which I am familiar have been extremely limited in molding capacity, and in the size range of the parts which may be produced, as well as the types and sizes of dies which could be handled. These prior machines have also in most instances been very bulky and have therefore occupied an excessive amount of space in comparison with the limited results attainable by the apparatus, and have in various other respects been lacking in versatility and convenience of operation.

SUMMARY OF THE INVENTION

Injection molding equipment constructed in accordance with the present invention, while incorporating certain features which may if desired be applied to molding apparatus of any size, is in certain respects especially useful in prototyping and other short run situations, in which maximum versatility of operation is extremely important. As will appear, the equipment may be very easily and readily converted between different conditions for handling molding dies of numerous different sizes, as well as for injecting different quantities of plastic in a single operation, and for varying the injection pressure under which the plastic is forced into a die.

A machine formed in accordance with the invention includes two clamping structures one of which is movable toward and away from the other to clamp an injection molding die therebetween, with one of the structures carrying means for then injecting a heated plastic or other moldable substance under pressure into the die. The movable one of the structures may be actuable toward the other by a fluid pressure actuated power unit, desirably a power piston. In addition, the movable structure is mounted also for bodily adjusting movement relative to the power piston or other powered element to thereby effectively adjust the range of powered displacement of the clamping structure, and thus attain maximum versatility as to the size of die which may be utilized, and the facility with which the die may be clamped and released. The adjusting movement of the movable clamping structure relative to the piston may be effected by means of an adjusting screw, which may threadedly engage the power piston or other powered element, and which may be actuable by an appropriate manually operated handle. Preferably, the movable clamping structure is in the form of a work supporting table, while the second clamping structure takes the form of an injection head disposed above the table and connected to a supporting base by vertical columns which guide the table for its upward and downward movement.

The pressure which is applied to the molding material upon injection, as well as the maximum quantity of molding material which may be injected on a single operation, may both be adjusted by utilizing different sizes of injection cylinder liners, and different sizes of coacting rams, preferably in conjunction with different selectively usable injection nozzles in the equipment. For rapid conversion between these different conditions, the cylinder liner is so mounted and positioned as to be retained in the cylinder by the injection nozzle itself, so that upon removal of the nozzle, the liner may be easily withdrawn from the cylinder body, for replacement by a nozzle and liner of a changed size, or merely for cleaning of the parts. All of this may be attained without detachment of any of the other portions of the injection cylinder assembly. Also, the pressure applied to the molding material may be further controlled and varied by adjustment of the pressure of a supply of compressed air or other pressure fluid which is applied to a ram actuating piston or the like.

Certain additional features of novelty of the invention reside in the provision of a unique type of control valve for supplying pressure fluid to the clamping cylinder or to the cylinder for actuating the injection ram. This valve is actuable between an open position for admitting pressure fluid to the associated cylinder, and a closed position for terminating the flow of pressure fluid to that cylinder, and is provided with an auxiliary valve element for automatically venting the pressure fluid from the cylinder upon closure of the first mentioned valve element. Preferably, the primary valve element is mounted to turn about an axis, and the actuating element which turns this valve coacts with the auxiliary valve element to displace it axially to its open venting position upon arrival of the primary valve at its fully closed setting.

BRIEF DESCRIPTION OF THE DRAWING

The above and other features and objects of the invention will be better understood from the following detailed description of the typical embodiment illustrated in the accompanying drawings in which:

FIG. 1 is a perspective representation of an injection molding machine constructed in accordance with the invention;

FIG. 2 is an enlarged central vertical section taken essentially on line 2—2 of FIG. 1, and partially broken away to occupy a reduced vertical height, in order that the various parts may be shown at maximum size;

FIG. 3 is an enlarged vertical section through one of the air flow controlling valves;

FIG. 4 is a further enlarged fragmentary section taken on line 4—4 of FIG. 3;

FIG. 5 is a fragmentary vertical section on line 5—5 of FIG. 1;

DESCRIPTION OF THE PREFERRED EMBODIMENT

Figure 6:
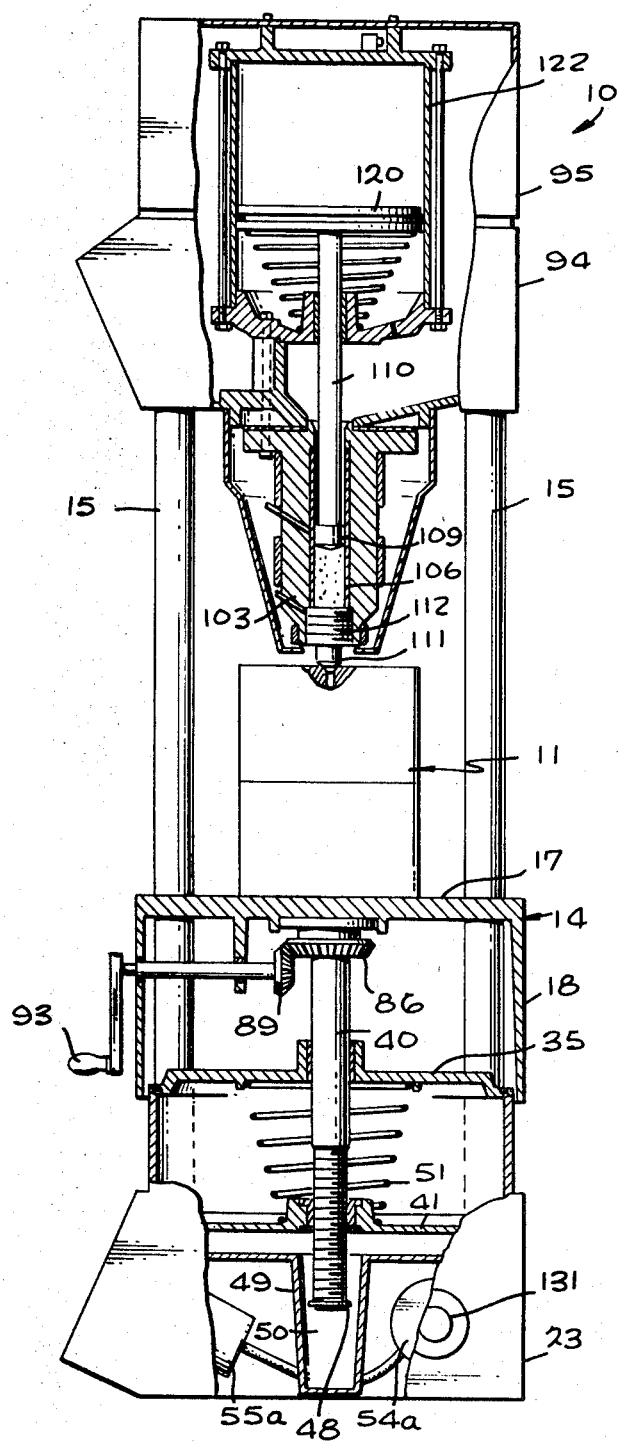
FIG. 6 is a somewhat reduced scale view similar to FIG. 2, but showing the apparatus in an injecting condition.

Referring first to FIG. 1, I have illustrated at 10 an injection molding machine constructed in accordance with the invention, and adapted to be utilized for injecting a suitable molding compound, for example an appropriate thermosetting or thermoplastic resinous plastic material, into a molding die typically represented at 11. The machine includes a base 12, an upper injection head 13, and a vertically movable die supporting table 14. The table is guided by four parallel vertical corner posts or columns 15 for its vertical movement relative to base 12 and injection head 13.

Table 14 has a top wall 16 presenting an upper horizontal work supporting surface 17 which is square in horizontal section. At the periphery of its square top wall 16, table 14 has four depending vertical side walls 18, which enclose a later-to-be-described adjusting mechanism, and which extend downwardly about a portion of the base 12 in the FIG. 2 lowermost position of the table. At each of its four corners, the table has a boss portion 19 (see FIG. 5), containing a vertically extending cylindrical guide passage 20 which is received slidably about a corresponding one of the externally cylindrical vertical guide posts 15, in closely fitting relation thereon, to effectively guide the table for only its desired vertical movement. The corner boss portions 19 of the table are of sufficient vertical extent to maintain the table against tilting or cocking movement relative to the posts.

Base 12 of the machine may be considered as having a lower hollow portion 21 of essentially square horizontal section, and an upper hollow portion 22 of essentially circular horizontal section, with the latter serving as a power cylinder for actuating the table upwardly. Lower portion 21 of the base is defined by a rear vertical wall 23 (FIG. 2) two opposite vertical side walls 24 and 25 (FIGS. 1, 2 and 6), and a preferably inclined front wall 26 for carrying some of the controls of the machine. Rear wall 23 and the opposite side walls 24 and 25 are essentially aligned vertically with three of the depending walls or flanges 18 of table 14, as will be apparent from the figures. Internally within base 12, the upper and lower portions 21 and 22 of the base are separated by a horizontal wall or partition 27, serving as the bottom wall of the clamping cylinder, with a vertical cylindrical internal surface 28 extending upwardly from wall 27 to define the side wall of the clamping cylinder. Externally, the essentially square horizontal configuration of the base continues upwardly to the location designated 29 in FIG. 2, and upwardly beyond that point the side wall 30 of the base is both externally and internally cylindrical, about the main vertical axis 31 of the machine. At its four corners, the base has four thickened wall portions 32 (see FIG. 5), extending downwardly from the previously defined location 29, and containing vertical passages 33 within which the lower ends of posts or columns 15 are rigidly connected, as by threaded connections represented at 34 in FIG. 5.

At the upper end of the cylindrical vertical side wall 30 of the upper portion 22 of base 12, there is provided a horizontal circular top wall 35, which is appropriately connected rigidly to side wall 30, as by screws typically represented at 36, and which is annularly sealed with respect to side wall 30 by a seal element represented at 37. At its center, top wall 35 carries a tubular guide boss 38, containing a cylindrical bushing 39 within which an externally cylindrical piston rod 40 is guided for vertical movement along axis 31, and in fluid tight sealed relation with respect to wall 35. At its lower end, piston rod 40 is connected adjustably to a circular horizontal piston 41, having a peripheral annular seal 42 sealing the piston with respect to cylinder wall surface 28. The central portion of the piston carries a tubular nut element 43, which is mounted rigidly within a central vertical passage 44 in the piston, and is retained against rotation relative to the piston in suitable manner, as by an appropriate key and set screw (not shown). Part 43 contains a relatively coarse internal lead screw thread 45, which engages a corresponding external thread 46 formed on the lower portion of piston rod 40, and in a relation adjusting the piston rod 40 axially (upwardly and downwardly) relative to the piston in response to rotation of the piston rod. Upon such rotation, the piston itself is retained against rotation within the cylinder by virtue of the relatively tight frictional engagement of the piston and wall 28 with piston seal element 42. The piston rod is sealed in fluid tight relation with respect to the piston by provision of an annular seal element 47 formed of rubber or other elastomeric material, and having an internal thread which engages tightly against thread 46 of the piston rod in sealing relation. Upward movement of the piston rod relative to the piston is limited by provision on the lower end of the piston rod of a snap-ring or C-ring 48, received within and projecting radially outwardly from a groove in the piston rod, and adapted to engage upwardly against seal element 47 in the uppermost position of the piston rod. To receive the lower threaded portion of the piston rod in its lowermost FIG. 2 position, the horizontal partition or wall 27 of base 12 has a downwardly projecting portion 49 forming a closed vertical recess 50 into which the threaded portion of the piston rod may project.

The piston 41 is yieldingly urged downwardly to its FIG. 2 position by a typically tapered coil spring 51, whose upper end bears upwardly against top wall 35 of the clamping cylinder, and whose lower end is received and centered about a tubular central boss 52 of the piston. The piston is actuable upwardly by a pressurized fluid, desirably compressed air, supplied to the underside of piston 41 from a pressure fluid supply line 53 (FIG. 2) through a pressure regulator valve 54 and a pressure flow control valve 55, both of which valves are located within the lower hollow portion of the base. Pressure regulator valve 54 may be mounted to the left side wall 25 of the base, and has a control knob or actuating handle which is accessible from the outside of the base for adjusting the pressure of the air to be supplied to the underside of piston 41, with the pressure of that air being indicated on a pressure guage 56 (FIG. 1).

The flow control valve 55 introduces a controlled restriction into the air line leading to the clamping cylinder, and is mounted to the previously mentioned inclined front wall 26 of the base, through which the valve is controlled by an outer manually accessible control knob 57. FIG. 3 illustrates the internal construction of valve unit 55, which includes a valve body 58, rigidly secured to front wall 26 of the base by screws 59 or the like. Compressed air under a pressure determined by the setting of regulator valve 54 is fed into a passage 60 in valve body 58 through a line 61 leading from the regulator valve. The air flows leftwardly in FIG. 3 past an annular valve seat 62, and then flows downwardly through a passage 63 to an outlet or discharge line 64 leading to the interior of the clamping cylinder 27–28. The flow of air along this path may be closed off or restricted by a valve element 65, which extends along and is rotatable about an axis 66, and which has external threads 67 engaging internal threads 68 in body 58, to actuate element 65 toward and away from seat 62 in response to rotation of that element about axis 66. At its inner end, valve element 65 carries an annular O-ring 69, which is partially received within a groove formed in element 65 and is engageable in sealing relation with element 65 and seat 62. The outer end of valve element 65 is appropriately connected rigidly to control knob 57, as by a suitable set screw represented at 70 in FIG. 3.

Beneath and parallel to valve element 65, body 58 contains a passage 71, which receives a venting valve element 72 mounted to slide along an axis 73. Element 72 is externally circular at all points, having an enlarged diameter portion 74 received within a correspondingly enlarged portion of passage 71, and carrying an annular O-ring 75 to the left of this enlarged portion for engaging a valve seat 76 to close off the flow of air from passage 63 and line 64 into a vent outlet passage 77. Element 72 is urged leftwardly against seat 76 by a coil spring 78, which is backed up by a plug 79 threadedly connected into body 58. The left end portion of element 72 is slidably received and guided within a reduced portion 80 of passage 71, and is sealed with respect thereto by an O-ring 81, and has a rounded or hemispherically shaped end portion 82 which projects outwardly for engaging a camming ramp 83 carried by the inner side of knob 57. This ramp is of the configuration illustrated in FIG. 7, having an inclined surface 84 which deflects valve element 72 to the full line position of FIG. 4 (rightwardly as viewed in FIG. 3) upon arrival of knob 57 at a rotary position in which the primary valve element 65 is closed. In the ultimate completely closed position of valve element 65, the rounded end portion 82 of element 72 is received within a shallow notch 85 (FIG. 4), in ramp 83, to releasably retain the knob in that closed position, with element 72 in its open position for venting air from the cylinder through line 64 and past valve seat 76 to the vent outlet 77.

At is upper end, piston rod 40 (FIG. 2) rigidly carries a bevel gear 86, suitably keyed to the piston rod for rotation therewith. Above the bevel gear, there is provided a thrust bearing element 87, which is received within an appropriate central recess in the underside of table 17, and into which a reduced upper portion 88 of the piston rod projects. The thrust bearing element 87 transmits upward forces from piston rod 40 to the table, while allowing rotation of the piston rod and its bevel gear element 86 relative to the table and thrust bearing element 87.

For turning the piston rod about its vertical axis 31, I provide a second bevel gear 89, which meshes with and drives the first mentioned bevel gear 86, and which is turned about a horizontal axis 90 by a shaft 91 journaled in bushings 92 carried by table 17, with an actuating handle or crank 93 being provided at the outer end of the shaft for engagement by an operator.

The injection head 13 at the upper end of the machine is hollow and of essentially the same square horizontal section as table 14. The housing of this upper head 13 may be formed of a lower hollow portion 94, and an upper cover section 95, with the lower section 94 being shaped internally to provide a trough 96 (FIG. 2) into which a molding powder can be fed through a rear opening 97 closed by a swinging door 98. The trough 96 directs the molding compound into the upper end 99 of an injection cylinder 100, which may be contained within a tapering annular shroud 200, and be rigidly secured to section 94 by a series of circularly spaced bolts one of which is shown at 101. For attachment to these bolts, cylinder body 100 has an upper flange 102, beneath which the cylinder body has an externally reduced diameter portion 103 about which there are received two annular electrically energized heating coils 104 and 105. An internally and externally cylindrical liner sleeve 106 is removably received within the cylindrical bore 107 of cylinder body 100, and is engageable upwardly against a shoulder 108 in that body, and forms the cylinder within which the circular ram element 109 threadedly connected onto a piston rod 110 is vertically movable. The outer cylindrical surface of ram element 109 is dimensioned to fit closely within cylinder liner sleeve 106, to effectively force the molding compound downwardly within that sleeve and through an injection nozzle 111 which is threadedly connected at 112 into the lower end of cylinder body 100. The threads of nozzle 111 are of a diameter greater than the external diameter of liner sleeve 106, so that upon removal of the nozzle from cylinder body 100, the liner is also removable downwardly, for cleaning or for replacement by another cylinder of another diameter. Similarly, the ram element 109 can be unscrewed from piston rod 110, for cleaning or for replacement by a ram of changed size, so that the alteration in size of the ram and liner 106 can serve to vary the pressure under which plastic is injected through nozzle 111 into the die upon each actuation of the ram, and also to vary the maximum quantity of plastic which may be injected.

A third heating element 113 is received about a lower externally reduced diameter portion 114 of cylinder body 100, so that element 113 heats the nozzle while elements 104 and 105 heat cylinder liner 106. The temperature of liner 106 is sensed by a thermostatic probe element 115, which contacts the liner in heat transferring relation, while the temperature of the nozzle is sensed by another thermostatic probe element 116, which contacts the nozzle in heat conducting relation, with both of these elements being connected into cylinder body 100 in sealed relation, and both being positioned to remain in the cylinder body while the nozzle 111 and liner 106 are removed axially and then reinserted. Probe 115 is connected electrically to a thermostatic control unit 117 (FIG. 2), which regulates the delivery of electrical energy to heating units 104 and 105 in a relation maintaining the cylinder liner 106 at a predetermined uniform temperature determinable by the adjustment of the thermostatic unit 117 through its control knob 118. Similarly, probe 116 is conected to a second thermostatic unit regulated by a knob 119 (FIG. 1), which unit determines and regulates the temperature of nozzle 111 as heated by heating element 113. The molding compound is in this way melted within the injection cylinder 100, and maintained at a predetermined optimum injection temperature while in the cylinder and while being injected through nozzle 111 into die 11.

Ram 109 and its piston rod 110 are actuated by a piston 120 (FIG. 2), to which the rod 110 is threadedly connected at 121, and which piston is mounted within a cylinder 122 closed at its upper and lower ends by end walls 123 and 124. The two end walls are secured to the side wall 122 of the cylinder in any suitable manner, as by a series of circularly spaced bolts 125. The cylinder is also secured in fixed position relative to lower section 94 of the injection head, as by means of the previously mentioned circularly spaced bolts 101. Piston 120 is yieldingly urged upwardly by a tapered coil spring 126, to the retracted position of FIG. 2 in which ram 109 is withdrawn upwardly completely out of cylinder body 100. Cover 95 of the upper head portion of the machine may be suitably secured to the cylinder 122–123–124 by screws 126 (FIG. 2).

The upper injection head 13 of the machine is appropriately mounted on the upper ends of the four vertical posts 15. For this purpose, section 94 of the injection head may have four corner boss portions 127, one of which is illustrated in FIG. 5, and each of which contains a cylindrical recess 128 within which the upper end of a corresponding one of the posts 15 is received in closely confined relation, with an appropriate set screw or other retaining means 129 being provided for securing the parts rigidly together at these locations.

Actuating pressure fluid (preferably compressed air) is supplied to upper ram cylinder 122 from the same fluid inlet 53 (FIG. 2) as has been previously described in connection with the air supply system to the lower cylinder 27–28. From inlet 53, air flows through a branch line 130 to a pressure regulator valve 54a, which may be the same as that shown at 54 in FIG. 2, and which is desirably mounted to the right hand side wall 24 of the base. Regulator valve 54a is controlled by an external setting knob 131 accessible to an operator. From the pressure regulating valve 54a, the air flows to a second flow restricting valve 55a, which is identical with valve 55 of FIG. 2, and which is settable by an external knob 132 to regulate the rate of flow of compressed air to the upper end of injection cylinder 122 through an inlet fitting illustrated at 133 in the upper portion of FIG. 2. In order to avoid the necessity for external fluid lines leading to the upper injection head, the compressed air from valve 55a may be connected at 134 (FIG. 5) into the interior of one of the tubular vertical posts 15, to flow upwardly through that post for discharge from its upper end at 135 to the fitting 133. Similarly, air lines leading from the discharge sides of the two pressure regulator valves 54 and 54a to the previously mentioned pressure guage 56, and a second pressure guage 56a, may pass upwardly through the interior of others of the vertical columns 15.

To now describe a cycle of use of the illustrated equipment, assume first of all that the apparatus is in the condition of FIG. 2, and that it is desired to utilize the apparatus for injecting molten and pressurized resinous plastic material into a die. The die 11 is first placed on the upper surface of table 17 at a location beneath nozzle 111, and crank 93 is then actuated to move the table upwardly until the injection opening of the die is positioned just slightly beneath the lower end of the nozzle. During such adjustment of the table, the turning of the crank acts through bevel gears 89 and 86 to rotate piston rod 40 about vertical axis 31 relative to piston 41 and nut element 42, to thus adjust the piston rod upwardly to the desired position. After the table has thus been shifted upwardly until the die is almost in contact with injection nozzle 111, and assuming that both of the pressure regulating valves 54 and 54a have been preset to desired output pressures, knob 57 is turned to a setting in which it opens primary valve element 65 of FIG. 3 to a predetermined flow rate setting, in which the restriction offered by this valve at seat 62 is just sufficient to cause a predetermined rate of upward movement of piston 41 within its cylinder. Thus, excessively rapid actuation of the clamping piston and table 14 is avoided, and the die is moved upwardly against nozzle 111 relatively gradually, but with the ultimate application of the full pressure to which regulator valve 54 has been set. Because of the preadjustment of the table by crank 93, the power piston 41 need only move upwardly a very short distance before the die and nozzle are in proper fluid injecting relation, and only a minimum amount of actuating air is therefore required.

After the clamping piston is thus actuated to clamp the die tightly between the table and upper injection head, and assuming that a desired quantity of molding powder has already been filled into ram cylinder body 100 past door 98, the operator then actuates the second forward control knob 132, to a predetermined flow rate setting in which compressed air is passed through valve 55a with predetermined restriction into upper power cylinder 122, to actuate piston 120 and ram 109 downwardly in a manner forcing the molten plastic downwardly from cylinder liner 106 and through nozzle 111 into the die. As in the clamping action, too rapid injection of the plastic is avoided by the restriction to air flow afforded by flow control valve 55a, which restriction is controllable within a wide range of movement of valve element 65 of FIG. 3.

After the injection operation is completed, the operator turns both of the knobs 57 and 132 to their closed positions, in which their primary valve elements 65 of FIG. 3 engage their respective seats 62 to close off the supply of air to the power cylinders. Upon arrival of the knobs 57 and 132 at their closed settings, the ramp 83 (FIG. 4) of each of the knobs actuates the related vent valve element 72 to its open position to vent air from the associated power cylinder past the seat 76 of FIG. 3 and to the atmosphere through outlet 77, so that each of the pistons 41 and 120 may be returned to its FIG. 2 setting by the related spring 51 or 126, in preparation for the next operation of the machine.

Figure 7:
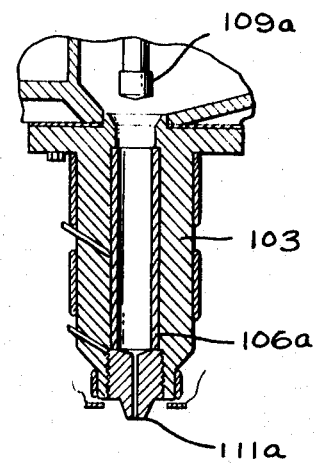
FIG. 7 is a view showing use of an injection ram and cylinder of changed size.

If on the next operation it is desired to utilize a die of a different vertical height, table 17 is again adjusted vertically until that particular die is received in closely spaced relation to nozzle 111. Also, if it becomes desirable to alter the size of the injection ram, nozzle 111 and liner 106 are removed from cylinder body 100, and as seen in FIG. 7 another liner 106a, with a different wall thickness and a different internal diameter, is substituted, and is then held in position by either the same nozzle or a different nozzle 111a, with a different ram element 109a of a correspondingly changed external diameter being substituted for the ram 109 of FIG. 2, so that the ram will force plastic into the die at a different pressure and rate, and up to a different maximum quantity. The temperatures of the liner 106 or 106a and nozzle 111 or 111a may be adjusted by setting knobs 118 and 119 to appropriate conditions; and both the air pressure and rate of air flow to each of the power cylinders may be regulated by valves 54, 54a, 55 and 55a, to produce optimum injection conditions for virtually any situation which may arise.

I claim:

1. Injection molding apparatus comprising a base, an injection head spaced above said base, a downwardly facing nozzle carried by said head and forming a first clamping element and containing a passage through which a molding material is injected into a molding die, means forming a hopper chamber in said head for receiving a supply of said molding material and feeding it to said nozzle, a feed cylinder extending upwardly from and communicating with the nozzle and through which said material passes to the nozzle, a feed ram in said cylinder movable downwardly to force a charge of said material through the nozzle, a second and larger cylinder above said first cylinder, a piston in said second cylinder actuable by pressure fluid to force said ram downwardly, a plurality of guide columns extending vertically between and interconnecting said base and said head, a clamping table between said base and head and guided by said columns for upward and downward movement to clamp a die against the nozzle, a third cylinder carried by said base, a clamping piston in said third cylinder actuable upwardly by pressure fluid to correspondingly raise said table, a first vertical threaded element actuable upwardly and downwardly by said piston, a second vertical threaded element connected rotatably to said table and threadedly to said first threaded element and operable by rotation to adjust said table vertically relative to said clamping piston, and means for turning said second threaded element, said nozzle being constructed and mounted to take and withstand substantially the full upward clamping force exerted by said clamping piston to thereby tightly clamp the die vertically between said nozzle and said table, said nozzle being constructed to form a fluid tight seal with said die entirely about said passage in the nozzle upon exertion of clamping force upwardly against the nozzle by said clamping piston through said threaded elements and said table and said die.

2. Injection molding apparatus as recited in claim 1, including a threaded connection detachably mounting said nozzle to said head in a position of downward projection from the head.

3. Injection molding apparatus as recited in claim 1, including valve means carried by said base for controlling the delivery of actuating pressure fluid to said second cylinder and to said third cylinder.

4. Injection molding apparatus as recited in claim 1, in which said ram is retractable upwardly to a position of withdrawal from said first cylinder and into a lower portion of said hopper in which said molding material may flow from the hopper into said first cylinder.

5. Injection molding apparatus as recited in claim 4, including a threaded connection detachably mounting said nozzle to said head in a position of downward projection from the head, first valve means carried by said base for controlling the delivery of actuating pressure fluid to said second cylinder, additional valve means carried by said base for controlling the delivery of pressure fluid to said third cylinder, a conduit extending from said first valve means to said second cylinder through one of said columns, and a spring yieldingly retracting said first mentioned piston upwardly.

6. Injection molding apparatus as recited in claim 1, including means forming a passage in one of said columns through which actuating pressure fluid is delivered to said second cylinder.

References Cited

UNITED STATES PATENTS

| | | | |
|---|---|---|---|
| 2,618,823 | 11/1952 | Perkon | 18—30LA |
| 2,572,953 | 10/1951 | Saari | 18—16E |
| 3,221,373 | 12/1965 | Kwan | 18—30 |
| 2,825,931 | 3/1958 | Lockridge | 18—30 |
| 2,600,958 | 6/1952 | Barton | 18—30 |

FOREIGN PATENTS

| | | | |
|---|---|---|---|
| 973,944 | 2/1951 | France | 18—30 |
| 993,519 | 11/1951 | France | 18—30 |

CHARLES W. LANHAM, Primary Examiner

R. M. ROGERS, Assistant Examiner

U.S. Cl. X.R.

18—30LC; 164—341